(12) United States Patent
Schottland et al.

(10) Patent No.: US 10,577,485 B2
(45) Date of Patent: Mar. 3, 2020

(54) GAS BARRIER COATING COMPOSITIONS

(71) Applicant: SUN CHEMICAL CORPORATION, Parsippany, NJ (US)

(72) Inventors: Philippe Schottland, Sparta, NJ (US); Atsuhisa Miyawaki, Chiba (JP); Kenji Nakamura, Chiba (JP); Hiroyuki Takeda, Chiba (JP)

(73) Assignee: Sun Chemical Corporation, Parsippany, NJ (US)

( * ) Notice: Subject to any disclaimer, the term of this patent is extended or adjusted under 35 U.S.C. 154(b) by 101 days.

(21) Appl. No.: 15/572,259

(22) PCT Filed: May 5, 2016

(86) PCT No.: PCT/US2016/030879
§ 371 (c)(1),
(2) Date: Nov. 7, 2017

(87) PCT Pub. No.: WO2016/182829
PCT Pub. Date: Nov. 17, 2016

(65) Prior Publication Data
US 2018/0118921 A1     May 3, 2018

Related U.S. Application Data

(60) Provisional application No. 62/158,616, filed on May 8, 2015.

(51) Int. Cl.
*C08K 7/10* (2006.01)
*C08K 3/34* (2006.01)
(Continued)

(52) U.S. Cl.
CPC ............... *C08K 7/10* (2013.01); *C08K 3/34* (2013.01); *C08K 3/346* (2013.01); *C09C 1/42* (2013.01); *C09D 5/00* (2013.01); *C09D 7/67* (2018.01); *C09D 169/00* (2013.01); *C08K 9/04* (2013.01); *C08K 2201/008* (2013.01); *C08K 2201/016* (2013.01)

(58) Field of Classification Search
CPC ... C08K 7/10; C08K 3/34; C08K 9/04; C08K 2201/008; C08K 2201/016; C09D 169/00; C09D 5/00; C09D 7/67
See application file for complete search history.

(56) References Cited

U.S. PATENT DOCUMENTS

2007/0191510 A1* 8/2007 Chaiko .................. C08K 9/04
523/205

OTHER PUBLICATIONS

Maiti et al., Structure and Properties of Some Novel Fluoroelastomer/Clay Nanocomposites with Special References to Their Interaction, Journal of Polymer Science: Part B: Polymer Physics, vol. 44, 2006, pp. 162-176.*

(Continued)

*Primary Examiner* — Robert D Harlan
(74) *Attorney, Agent, or Firm* — Charles C. Achkar; Ostrolenk Faber LLP.

(57) ABSTRACT

The present invention is directed to gas barrier coating compositions comprising a nanocomposite formed from a polymer and a nanoparticulate clay. The gas barrier coatings are applied to packaging materials such as food and pharmaceutical packaging and exhibit improved adhesion and barriers to gases such as oxygen, carbon dioxide, nitrogen and water vapour.

20 Claims, 9 Drawing Sheets

(51) Int. Cl.
*C09D 169/00* (2006.01)
*C09D 7/40* (2018.01)
*C09D 5/00* (2006.01)
*C09C 1/42* (2006.01)
*C08K 9/04* (2006.01)

(56) References Cited

OTHER PUBLICATIONS

Stockelhuber et al., Contribution of Physico-Chemical Properties of Interfaces on Dispersibility, Adhesion and Flocculation of Filler Particles in Rubber, Polymer vol. 51, 2010 pp. 1954-1963.*
International Preliminary Report on Patentability issued in Application No. PCT/US2016/030879 dated Aug. 5, 2016.
International Search Report issued in International Application No. PCT/US2016/030879 dated Aug. 5, 2016.
Written Opinion of the International Searching Authority issued in International Application No. PCT/US2016/030879 dated Aug. 5, 2016.
Maiti et al., Structure and Properties of Some Novel Fluoroelastomer/ Clay Nanocomposites with Special Reference to Their Interaction, Journal of Polymer Science: Part B: Polymer Physics, vol. 44, 2006, pp. 162-176.
Stockelhuber et al., Contribution of Physico-Chemical Properties of Interfaces on Dispersibility, Adhesion and Flocculation of Filler Particles in Rubber, Polymer, vol. 51, Mar. 15, 2010, pp. 1954-1963.
Natarajan et al., Effect of Interfacial Energetics on Dispersion and Glass Transition Temperature in Polymer Nanocomposites, Macromolecules, vol. 46, Mar. 25, 2013, pp. 2833-2841.

* cited by examiner

☐ Wetting: resin - clay

☐ Adhesion ($W_{ad}$): resin - clay

☐ Flocculation ($\Delta W_{floc}$): resin - resin and clay - clay

GAS BARRIER COATING COMPOSITIONS

CROSS REFERENCE TO RELATED APPLICATIONS

The present application is a § 371 National Phase application based on PCT/US2016/030879 filed May 5, 2016, which claims the benefit of U.S. Provisional Application No(s). 62/158,616, filed May 8, 2015 the subject matter of each of which is incorporated by reference in their entirety.

FIELD OF THE INVENTION

The present invention is directed to gas barrier coating compositions comprising a nanocomposite formed from a polymer and a nanoparticulate clay. The gas barrier coatings are applied to packaging materials such as food and pharmaceutical packaging and exhibit improved adhesion and barriers to gases such as oxygen, carbon dioxide, nitrogen and water vapour.

BACKGROUND TO THE INVENTION

The present invention relates to gas barrier coatings, particularly having the ability to block the ingress of oxygen and other gases such as carbon dioxide or nitrogen, and which may be used to coat and impart gas barrier properties to a variety of materials, notably packaging for foods and pharmaceuticals, where exposure to oxygen needs to be eliminated or restricted. The gas barrier, adhesive, and cohesive properties of the coatings are manipulated using surface energetics.

Research paper "Effect of Interfacial Energetics on Dispersion and Glass Transition Temperature in Polymer Nanocomposites (*Macromolecules* 2013, 46, 2833-2841)" describes quantitative relationships between interfacial surface energy parameters and the dispersion and Tg shifts of polymer nanocomposites on a series of hybrid systems which include a variety of matrices varying from polar to non-polar (poly(2-vinylpyridine), poly(methyl methacrylate), poly(ethyl methacrylate) and polystyrene filled with three monofunctional silane modifications of colloidal silica nanospheres (octyldimethylmethoxy silane, chloropropyldimethylethoxy silane, and aminopropyldimethylethoxy silane).

SUMMARY OF THE INVENTION

The present invention provides a barrier coating composition comprising a nanocomposite wherein the nanocomposite comprises
a) a polymer having a surface tension of between 20 to 60 mJ/m² having a dispersive component of between 10 to 50 mJ/m² and a polar component of between 2 to 40 mJ/m² and
b) and a nanoparticulate clay modified with a surface active agent having an aspect ratio of between 20 to 30000 and a surface tension of between 20 to 60 mJ/m² having a dispersive component of between 10 to 50 mJ/m² and a polar component of between 2 to 40 mJ/m² and
wherein the adhesion ($W_{ad}$) between the polymer and the clay is greater than 60 mJ/m², the flocculation ($W_{floc}$) representing the dispersion of the clay in the polymer is not greater than 10 mJ/m² and the contact angle (θ) between polymer and the clay is less than 30.

Furthermore the present invention provides a coated article or substrate comprising a barrier coating composition on the surface of the article or substrate.

Finally the present invention process for preparing a coated article or coated substrate comprising
a) applying the barrier coating composition according to the present invention to the surface of the article or substrate and
b) drying the barrier coating composition.

These and other objects, advantages, and features of the invention will become apparent to those persons skilled in the art upon reading the details of the methods and formulations as more fully described below.

DETAILED DESCRIPTION OF THE INVENTION

Figure 1:
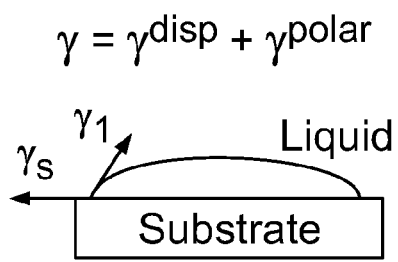
FIG. 1 demonstrates the affinity between a filler and resin.
Figure 1:
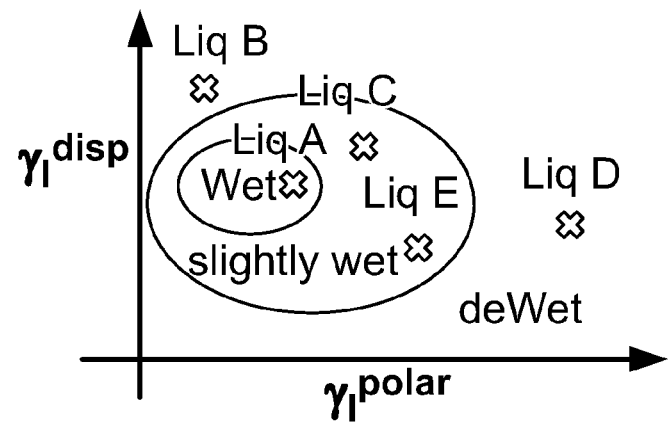

The present invention is directed to gas barrier coating compositions comprising a nanocomposite formed from a polymer and a nanoparticulate clay and in particular non aqueous gas barrier coating compositions.

Nanoparticulate clays are typically hydrophilic and are thus primarily used with water polymers to provide aqueous coating formulations. However such aqueous coating formulations do not provide adequate water or moisture resistance for most food packaging applications.

Furthermore, nanoparticulate clays in such formulations are limited to those having a fairly low aspect ratio in order to provide cohesive films that in turn maintain high lamination bond strengths.

Clays are readily exfoliated in water and exfoliated clay dispersions are readily compatible with certain types of polymer provided they are dissolved in water or aqueous mixtures composed mainly of water with lower proportions of water miscible organic solvents such as lower alcohols (such additions of organic solvent being important to facilitate coating viscosity, rheology, anti-foaming, substrate wetting and drying speed requirements).

Such coating formulations provide excellent barriers to oxygen and other gases provided they are maintained in a dry state. However in conditions where relative humidity is high or the coating comes into contact with water, the polymer may be partially dissolved or plasticized and the hydrophilic nature of the clay particles accelerates this process further, leading to loss of barrier and even adhesive and cohesive failure of the coating to substrate or laminate.

Flexible food and pharmaceutical packaging is usually designed and constructed to isolate the contents from the exterior environment thus keeping unwanted gases out while maintaining internal atmospheres necessary to prolong product quality and shelf life. Such situations might require humid 100% saturated internal atmospheres or completely dry internal atmospheres while the external atmospheric storage conditions may vary to being saturated with moisture vapor (e.g. as commonly found in tropical climates) or very dry (e.g. as may be found in desert or near desert locations). If the barrier coating used to enhance the performance of the packaging is affected by moisture it is likely to fail under such conditions and allow increased transmission of gases which affects the contents detrimentally. Hence, while it is possible to provide such aqueous coatings within moisture protective plies of laminate package structures, that protection is not adequate for all conditions and the usefulness of such technology is limited to packaging situations where the packaged product is dry and or the package is not stored or exposed to external conditions where the relative humidity exceeds typically 65%. Consequently there is a requirement to provide alternative barrier technologies for the flexible packaging market.

Accordingly the present invention provides a gas barrier coating composition that overcomes the above mentioned deficiencies and it has been found that by treating the surfaces of high aspect ratio clays with surface active agents it is possible to improve their compatibility with solvent soluble polymers and thus avoid the restrictions that are present when formulating aqueous coatings.

Furthermore by matching the surface energy components of the dispersed clay and dissolved polymer the particle-particle flocculation can be minized and polymer-particle interaction maximized.

Consequently the poor water and moisture resistance common to aqueous systems is avoided and the use of high aspect ratio nanoparticulate clay particles provides coatings with superior gas barrier properties and the use of solvents results in significant increases in drying speed allowing in line conversion with printing inks.

In particular, the coating compositions according to the present invention dry as fast as common impression flexo and high speed gravure printing inks, thus permitting in line conversion of printed gas barrier laminate structures suitable for flexible food and pharmaceutical packaging.

Furthermore the present invention provides stable dispersions of high aspect ratio nanoparticulate clays that do not settle or separate on storage and the gas barrier coatings based upon high aspect ratio nanoparticulate clays provide high adhesive lamination bond strengths, and barriers to gases such as oxygen, carbon dioxide and nitrogen and water vapor.

Additionally the gas barrier coatings also provide barriers to aromas and nuisance substances such as photoinitiators, unreacted monomers, plasticizers, and mineral oils.

Furthermore the coating compositions provide a single commercial combined moisture and gas barrier, improved water and moisture resistance in the coated laminate or monoweb packaging, compositions that are chlorine free and that can be used in pasteurization and retort applications.

Finally the coating compositions provide coatings that are more flexible than metal oxide or vacuum metallized barrier packaging which results in sustained barrier properties throughout the packaging process and shelf life.

The polymer used in the coating composition of the present invention is based upon the required application properties such as adhesion to specific packaging substrates, flexibility, packaging performance and organoleptic properties.

Typically the polymers are selected from polyurethanes, polyester-urethanes, polyesters, polyamides, cellulose derivatives (esters, ethers, nitrated esters, carboxylated etc.) rosin esters, phenolic modified rosin esters, polypropylene carbonate resins, ketone resins, maleinised rosin esters, shellac, poly lactic acid, acrylics, styrenated acrylics, vinyl chloride co-polymers, vinyl esters and/or vinyl alcohol co-polymers.

Advantageously the polymers are selected from a polypropylene carbonate resin, a ketone resin and polyurethane.

Unlike water based gas barrier coatings where the polymer typically contributes to the gas barrier as well as the clay, most organic solvent soluble polymers are not good gas barriers and therefor the barrier is obtained primarily by selection of the clay.

Usually this means that the clay must be of higher aspect ratio than that typically used in aqueous systems.

However it is known that the use of high aspect ratio clays limits the flexibility of the coating in which they are dispersed. This in turn often leads to adhesion and cohesion failure in flexible packaging applications where lack of flexibility initiates adhesion failure to the substrate or cohesion failure within the laminate structure. Consequently high aspect ratio clays are therefore less widely used in aqueous coating technology.

Surprisingly it has been found that the modeling the wetting tensions of the polymer and clay enables the selection of compatible polymer/clay combinations which not only provide stable dispersions but also high laminate bond strengths and low oxygen transfer rate/moisture vapor transfer rate (OTR/MVTR) values.

The polymer used in the preparation of the nanocomposite has a surface tension of between 20 to 60 $mJ/m^2$ which constitutes a dispersive component of between 10 to 50 $mJ/m^2$ and a polar component of between 2 to 40 $mJ/m^2$.

Advantageously the polymer has a surface tension of between 30 to 50 $mJ/m^2$ which constitutes dispersive component of between 25 to 45 $mJ/m^2$ and a polar component of between 3 to 20 $mJ/m^2$.

Similarly the surface of the nanoparticulate clay when modified with a surface active agent has a surface tension of between 20 to 60 $mJ/m^2$ which constitutes a dispersive component of between 10 to 50 $mJ/m^2$ and a polar component of between 2 to 40 $mJ/m^2$.

Advantageously the modified clay has a surface tension of between 30 to 50 $mJ/m^2$ which constitutes a dispersive component of between 25 to 45 $mJ/m^2$ and a polar component of between 3 to 20 $mJ/m^2$.

The nanoparticulate clays have an aspect ratio of between 20 and 30,000 and create a tortuous pathway in the dry film, which hinders the passage of gases such as oxygen and carbon dioxide and moisture. Preferably, the nanoparticulate clays have an aspect ratio greater than 100.

The 'tortuous path theory' explains that particulates with high aspect ratios (i.e. platy particle morphology in which the longest dimension is many times greater than the smallest, typically the thickness) naturally orientate within a coating film as it dries. The thickness of the applied dry coating is many times greater than the thickness of a single particle and hence hundreds of layers of these particles align parallel to the substrate surface thus forming an interleaved or brick wall structure within the coating polymer. Each particle is itself a barrier to oxygen and moisture vapor as well as other gases, but the discontinuous arrangement of particles means that spaces exist between the particles which allow the passage of gases though the coating film. Hence when such a high number of particle layers exist, the pathway for gas molecules increases in length and the resulting gas transmission is reduced to the point of providing useful barrier. Furthermore, as the aspect ratio of these particulates, more specifically the lateral dimension, increases, so does the accessible pathway for gas molecules and hence leads to further improvements in barrier or reduced transmission.

Suitable clays include kaolinite, hectorite, montmorillonite, vermiculite, atapulgite, illite, bentonite, halloysite, kaolin, mica, diatomaceous earth and fuller's earth, calcined aluminum silicate, hydrated aluminum silicate, magnesium aluminum silicate, sodium silicate and magnesium silicate.

Advantageously the clays are selected from montmorillonite, mica and/or vermiculite.

Commercial examples of suitable materials include Cloisite Na+ (available from Southern Clay), Microlite (available form Specialty Vermiculite Corp), Somasif ME 100 (available from Co-Op Chemical Japan), Kunipia F, G, G4, and G10 Montmorillonites (from Kunimine Japan) and Nanomer clay materials (ex Nanocor Inc.).

The present invention requires the efficient disaggregation and dispersion of nanoparticulate clay platelets in lipophilic organic polymers to optimize the nanocomposite's properties and requires organophilisation of the clay.

Typically this is usually achieved by wet (aqueous) chemistry cation exchange of hydrophilic inorganic interlayer cations, pre-existing on the clay, by organic cationic surfactants (e.g. alkylammonium) rendering the clay platelets lipophilic.

After optimizing the suspension of clay in water and subsequently exchanging the inorganic cations with organic ones, the clay flocculates and settles from the aqueous suspension from which the separated clay can then be re-dispersed in a compatible organic solvent or used in extrusion processes without re-dispersion in solvent.

Alternatively other classes of surfactants can be used to control the surface energy of the clay platelets and improve compatibility with the polymer component. Such surfactants would include, for example anionic, amphoteric and nonionic surface active agents. Whilst ion exchange is not possible with these types of surfactants, covalent bonds between functional groups on the clay platelet and the surfactant molecules may be achieved through reaction with organo silane, organo titanate or organo zirconate intermediates, substituted phosphates and inorganic acids such as phosphoric acid.

The present invention uses Wetting Envelopes to plot compatibility of polymers and clays in the same space. The successful dispersion of nano clays in a polymer matrix in qualitative terms is known to rely upon the physio-chemical nature of the clay and polymer as well as the processing techniques employed.

A quantitative method studying similar nanocomposite mixtures for engineering plastics is known and the present invention adapts this theory to nanocomposite gas barrier coatings wherein three parameters namely, wetting, adhesion, and flocculation, are used to visualize the affinity between polymers and clays, with the assumption that the clay surface behaves as a liquid.

The wetting, dispersion, and agglomeration relationships of polymer nano-composites, formed from clay with polymer, are studied focusing on this Wetting Envelope theory. The measured contact angles of resins and clays provide an estimation of both dispersive and polar contributions, the sum of which approximate the surface energy, using the Owens and Wendt equation (OW). Both estimated values are used to draw a wetting envelope diagram as shown in FIG. 1. The diagram shows enveloped areas representing wetting of clay by a polymer. In particular, in the highlighted enclosed area it is possible to determine whether a chosen clay can wet a chosen polymer, as this is the area where contact angle $\theta$ is 0 deg and provides complete wetting.

Figure 2:
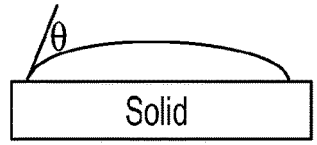
FIG. 2 shows the theories employed for estimating wetting, adhesion, and flocculation.
Figure 2:
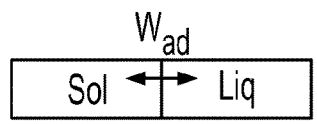
Figure 2:
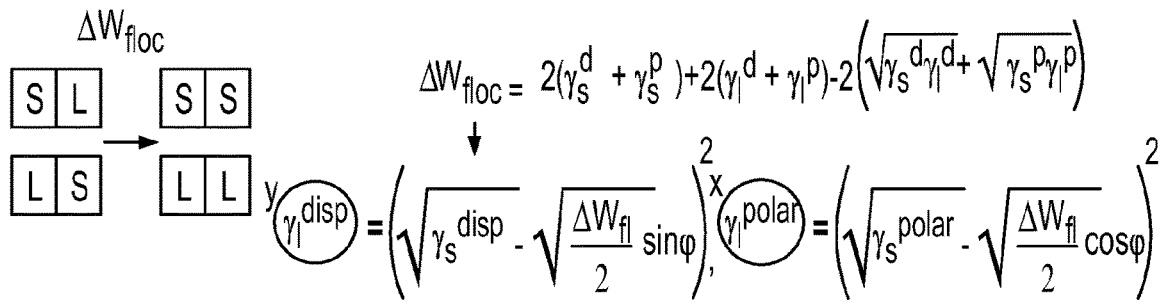

Adhesion ($W_{ad}$) between filler and resin, and flocculation ($\Delta W_{floc}$) between clay and clay, and, resin and resin are studied by using the equations as shown in FIG. 2. These are determined by both dispersive and polar factors of the surface energy. $W_{ad}$ represents strength of adhesion between clay and resin. A resin adheres to clay stronger, as the value of $W_{ad}$ increases. $\Delta W_{floc}$ represents dispersion of clay in a resin. Clay is less well dispersed, as the value of $\Delta W_{floc}$ increases. Therefore, a stable nano composite condition for ideal film structure which might result in good barrier too, seems to be the overlapped area when the contact angle of a probe solvent on the substrate approaches $\theta=0$ deg, higher value of $W_{ad}$, and lower value of $\Delta W_{floc}$.

These theories have been evaluated using clays with/without modification with known cationic surfactants such as quaternary amines (e.g.; C8a: octylammonium chloride, C11ca: 11-undecanoicammonioum chloride, C12ca:12-dodecanoicammonium chloride, TMAEM: tetramethylammonium ethylmethacrylate chloride), some conventional modified clays such as MPE (available from Co-op Chemical Japan) and some conventional solvent soluble polymers suitable for coatings applications such as polypropylene carbonate QPAC-40, polyethylene carbonate QPAC-25 (both are available from Empower), and ketone resin Bremar-7080 (available from KRAEMER) or lab made polyurethane using conventional synthetic procedures (e.g.; sk-611-176 and sk-611-177).

Figure 3:
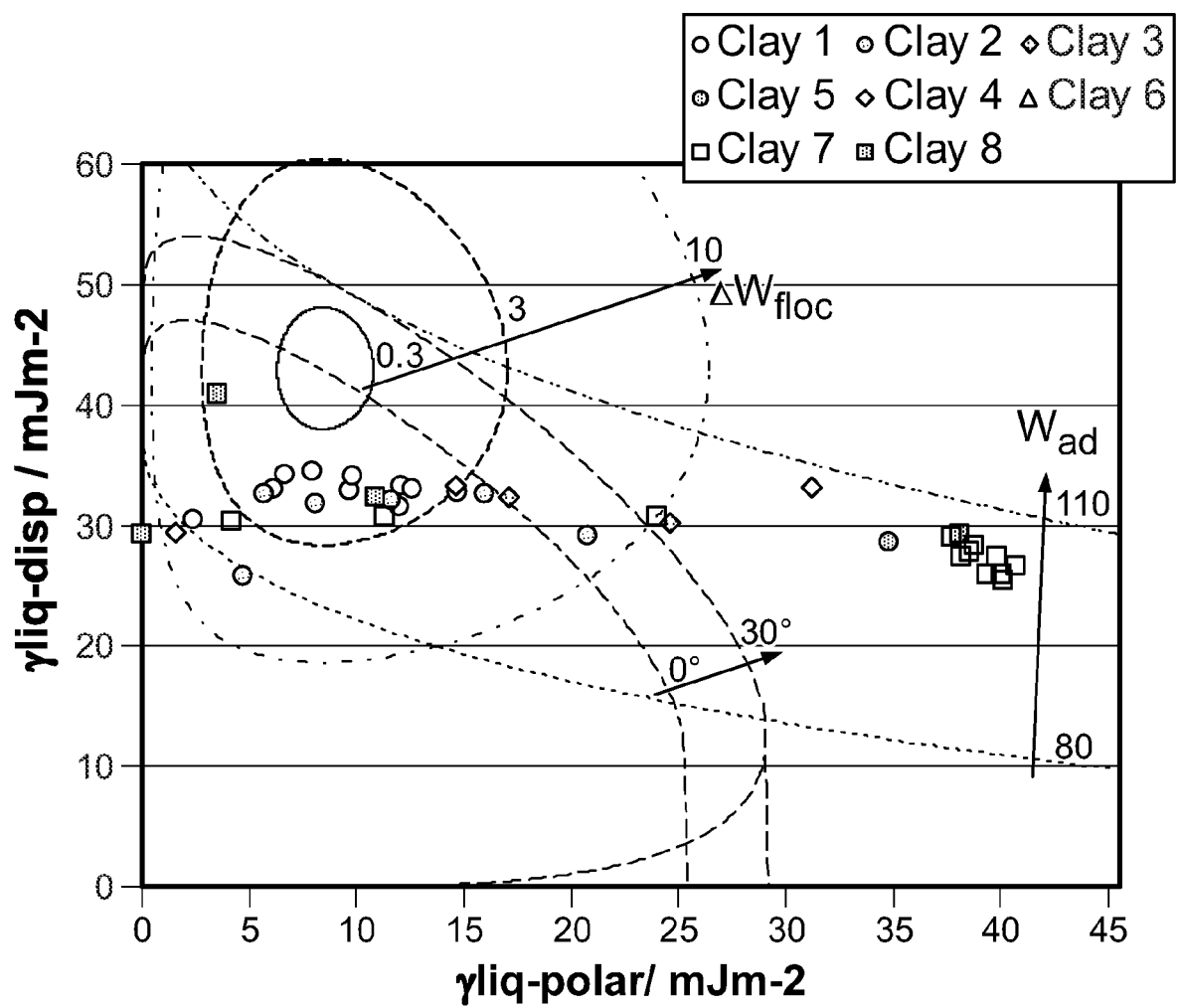
FIG. 3 shows a wetting envelope calculation for one polymer and a number of clays.

Firstly, clay dispersions and resin solutions in similar or identical solvents are coated onto a non-corona treated polyethylene terephthalate (PET) film. After removing solvents by drying, these films are stored in an oven at 40° C. overnight, to remove any remaining solvents. Next, two contact angles of the dried surfaces are measured by using water (highly polar) and di iodo methane (highly non-polar). From these measurements, both dispersive and polar factors of surface energy are estimated, by substituting the two contact angles into the Owens Wendt equation. Finally, three curves, wetting envelope, work of adhesion ($W_{ad}$), and work of flocculation $\Delta W_{floc}$), are obtained using the equations shown in FIG. 2. Note: only one polymer may be plotted against an infinite number of clays as shown in FIG. 3. Hence separate diagrams are created for each polymer.

Figure 4:
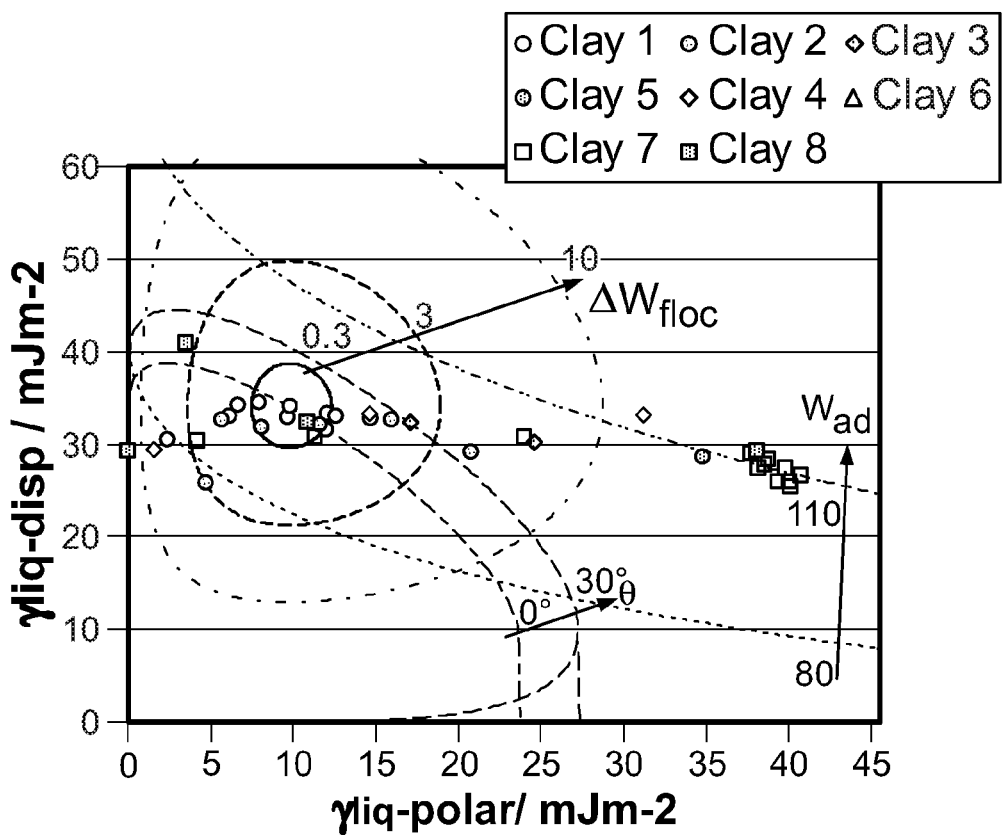
FIG. 4 shows a further wetting envelope for two different polymers with a number of clays.
Figure 4:
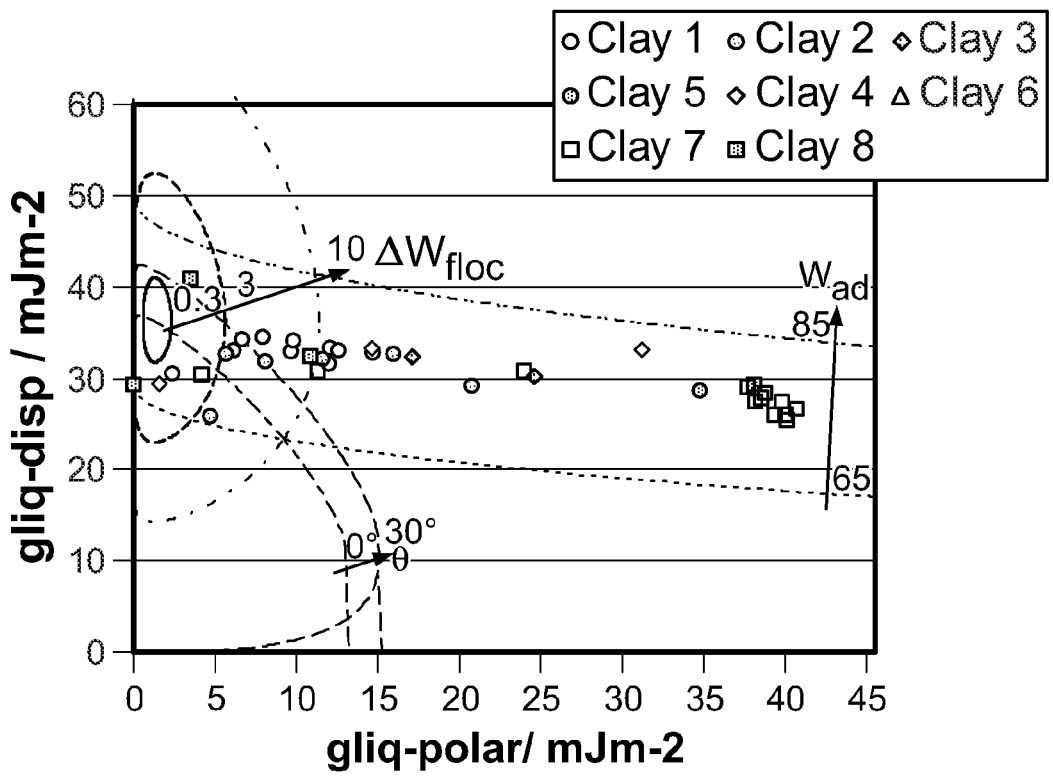

$\Delta W_{floc}=3$, and $W_{ad}=90$ are selected for practical evaluation as gas barrier coatings based upon the single polymer represented. Ideally a perfect match is located in the overlapped area of $\Delta W_{floc}=3$ and 0 deg$<\theta<$30 deg. The optimum ratio of clay to polymer is not indicated by these calculations and must be established by practical experiments. Further examples are shown in FIG. 4 where different polymers have been plotted against the same series of clays. Two polyurethanes with small changes made to the chemical structures show how the relationship to a given set of clay particulates alters the selection of the best combinations.

The gas barrier coating composition according to the present invention has an adhesion ($W_{ad}$) greater than 60 mJ/m², and preferably has adhesion ($W_{ad}$) greater than 90 mJ/m².

Furthermore the gas barrier coating composition exhibits a flocculation ($W_{floc}$) which is not greater than 5 mJ/m$^2$, preferably not greater than 3 mJ/m$^2$.

Finally the gas barrier coating composition has a contact angle (θ) of less than 20 and preferably less than 10, and is advantageously 0.

Typically the coating composition is applied to a substrate suitable for use as a packaging material, and is advantageously applied to a food, electronic or pharmaceutical packaging material.

The coated substrate may then be used to form a coated article, such as packaging article.

Alternatively the coating composition can be applied directly to the article to form the coated article, such as a packaging article.

Suitable substrates used to form the packaging materials may include polyesters, polyolefins, polyamides, styrenics and vinyls and the packaging materials may be formed from homopolymers or copolymers.

Typically the packaging materials are in the form of films.

The films may be corona treated or chemically treated i.e., with a coating such as an acrylic primer.

Additionally the films may be vacuum metallized with a metal layer, such as aluminum or an oxide such as AlO$_x$, SiO$_x$ or combinations thereof.

Furthermore the substrates may be in the form of monolayers or multilayers.

Multilayer structures may comprise different polymeric materials and also "tie-layers" to ensure adhesion between coextruded layers. The multilayer film may also be a laminate that has been extrusion laminated or laminated using a waterborne, solventborne, solvent-less or energy curable adhesive.

Polyester substrates may include materials such as PET, PEN or PLA.

Polyolefin substrates may include materials such as polyethylene or polypropylene and copolymers, a particular example being ethylene-methacrylic acid copolymer for packaging application is Surlyn ionomer resin.

The packaging materials may include polyamide films such as nylons comprising aliphatic and/or aromatic monomers, whilst Styrenics include polystyrene films and Vinyls include PVC, PVB and any homo- or copolymer comprising a vinyl monomer.

The films may be oriented for dimensional stability, such as oriented polyamide or bi-axially oriented polypropylene, be stretchable or have shrink properties (e.g., PET-g) or be thermoformable (such as amorphous PET).

Additionally, the composition may be applied to cellulosic substrates such as paper, preferably coated paper.

The compositions are usually applied to the surface of the substrate, which may be optionally overcoated with inks and/or an overprint varnish, or reverse printed and used in a laminated structure.

A flexible film with the barrier coating thereron may also be overcoated via co-extrusion with a layer of polymer. The co-extruded structure may then be thermoformed into a rigid or semi-rigid article.

Coated flexible packaging films may be used to form articles such as pouches, bags, sachets, trays, and lids. Additionally, the composition may be applied on a shrink film or on a pressure sensitive label and provide barrier to the container it is applied onto.

Furthermore the coated substrate may be in the form of monoweb or part of a multi-layer laminate structure.

Alternatively the compostions may also be applied directly onto rigid containers via a printing process or using a spray application.

In particular, the composition may be applied to the article or substrate using conventional deposition techniques including known printing and coating processes. Such printing processes include flexography, gravure, lithography, inkjet, thermal or laser transfer printing. Typical coating processes include flexography, gravure, roll, curtain, rod, blade, spray, and casting.

Finally the composition is dried using a thermal process such as forced air or infrared drying.

The invention is further described by the examples given below.

EXAMPLES

Experimental Procedure
Contact Angle Measurement

Suitable clay dispersions and resin solutions in similar or identical solvents are coated onto a polyethylene terephthalate (PET) film without corona treatment. After removing solvents by drying, these films are stored in oven at 40° C. overnight, to remove any remaining solvents. Wettability studies involve the measurement of contact angles as the primary data, which indicates the degree of wetting when a solid and liquid interact. Small contact angles (<90°) correspond to high wettability, while large contact angles (>90°) correspond to low wettability. Contact angles of the specimens were measured using the dynamic drop method with the Contact Angle Analyser OCA-20 (available from DataPhysics Instruments GmbH Germany). The main objective was to present a convenient approach to explain wetting phenomenon using contact angle theory with review of Young's and Young-Dupre equations. Although many other test-solvents were used for this measurement, the two main liquids (typically water "$H_2O$" and di-iodomethane "$CH_2I_2$") were applied to determine contact angle. Contact angle was determined by fitting the shape of the drop in the captured video image for 50 sec to the Young equation. The software, SCA20 Ver 3.60.1 build 191, does this automatically.

Surface Energy and its Dispersive and Polar Contributions

Studies concerning the interaction between a solid and liquid require experimental values of contact angle and surface energy. The quantitative evaluation of the wetting of a solid by a liquid is made in terms of the contact angle θ as herein described above.

Both dispersive and polar factors of surface energy are estimated by substituting two contact angles into the Owens Wendt equation to determine both the total surface energy and associated polar and dispersion components. For this, the contact angles with at least two test liquids, which are substituted into the Owens-Wendt-Kaelble model, sometimes termed as extended Fowke's model. The theoretical basis of this approach is the Young-Dupre equation as represented by Eq. 1 below. In this model, the work of adhesion $W_{ad}$ (and complimentary $W_{floc}$ is expressed in terms of the polar and dispersion components of the surface energy.

$$W_{ad} = \gamma_s(\cos\theta + 1) \quad \text{(Eq. 1)}$$

$$W_{ad} = 2[(\gamma ld)(\gamma sd)]^{1/2} + 2[(\gamma lp)(\gamma sp)]^{1/2} \quad \text{(Eq. 2)}$$

Preparation of a Diagram

To obtain a resin's three curves, Wetting Envelope, Work of Adhesion ($W_{ad}$), and Work of flocculation ($\Delta W_{floc}$), are drawn in the same diagram as a number of clays are plotted in by substituting both values of dispersive and polar contributions into the equations as shown in FIG. 2.

Oxygen Transmission Rate (OTR)

The oxygen transmission rates (OTR) of the coatings when applied to a polyester film were determined on a Mocon Oxtran 2/21 gas permeability tester at 23° C. and 65/0% relative humidity. This condition represents the normal test protocol for dry food packaging. Wherein the permeanent gas ($O_2$) is adjusted to 65% RH (23° C.) and the carrier gas (100% $N_2$) to 0% RH (23° C.). In addition, Mocon Oxtran 2/21 gas permeability tester at 23° C. and 50/50% relative humidity conditions were also evaluated.

The substrate used was freshly corona discharge treated 12 micron Mylar 800 or Melinex S (ex DuPont). The coatings were applied with a No. 0-4 K-Bar (ex. RK Print), delivering about 4-40 microns wet film thickness, and were dried in a warm flow of air (lab prints were dried with a hair dryer).

Moisture Vapor Transmission

The Mocon PERMATRAN-W Model 3/33 was used to measure the water vapor transmission rate of barrier materials. When testing the substrate film, the sample materials were placed in test cells, which are divided into two chambers separated by the sample material. The inner chamber is filled with nitrogen carrier gas and the outer chamber with water vapor saturated nitrogen (test gas) to a pre-determined % relative humidity. Mylar 800 Melinex S (ex DuPont) PET films were corona treated and coatings were applied using K-Bars (ex. RK Print) for the measurements.

Adhesion Tape Test

Coated films were tested for adhesion using the red tape (Cellulose spucing, 3 inch core). The results were marked 0 to 10, with 0 being no adhesion, and 10 very good adhesion.

Example 1

TABLE 1

Clays and modifiers used in the examples.

| | Modifiers | | | |
|---|---|---|---|---|
| Clay type | Cationic surfactants | bonding type | Substituted phosphates | bonding type |
| Montmorillonite | $NH_3$—$(CH_2)_n$-COOH (n = 3, 4, 5, 6, 7, 10, 11) | ionic bonding | $CH_3$—$(CH_2)_n$-$H_2PO_3$ (n = 7, 9, 17) | covalent bonding |
| Mica | $NH_3$—$(CH_2)_n$-$CH_3$ (n = 3, 4, 5, 6, 7, 10, 11, 18) | | $CH_3$—O—$PH_2O_3$ | |
| Vermiculite | $CH_3N(CH_2CH_2OH)_2$ | | $CH_3$—$(CH_2)_n$—O—$PH_2O_3$ (n = 3, 5) | |
| | $NH_3$—$CH_2$—Ph | | $CH_3$—$(CH_2)_{10}$—S—$(CH_2)_2$—$PH_2O_3$ (n = 3, 5) | |
| | N-tri(Me)(C18) | | $(CH_3)_3$—C—$PH_2O_3$ | |
| | N-di(Me)di(C18) | | Ph—O—$PH_2O_3$ | |
| | N—(Me)di(C2H5OH)(C18) | | Ph—$CH_2$—$PH_2O_3$ | |
| | Choline | | $NO_2$—Ph—$CH_2$—$PH_2O_3$ | |
| | P-tetra(Ph) | | Ph—$PH_2O_3$ | |
| | N-di(Me)(CH2Ph)(HT) | | | |
| | N-di(Me)di(HT) | | | |
| | N—(Me)di(C2H5OH)(T) | | | |

Example 2

Figure 5:
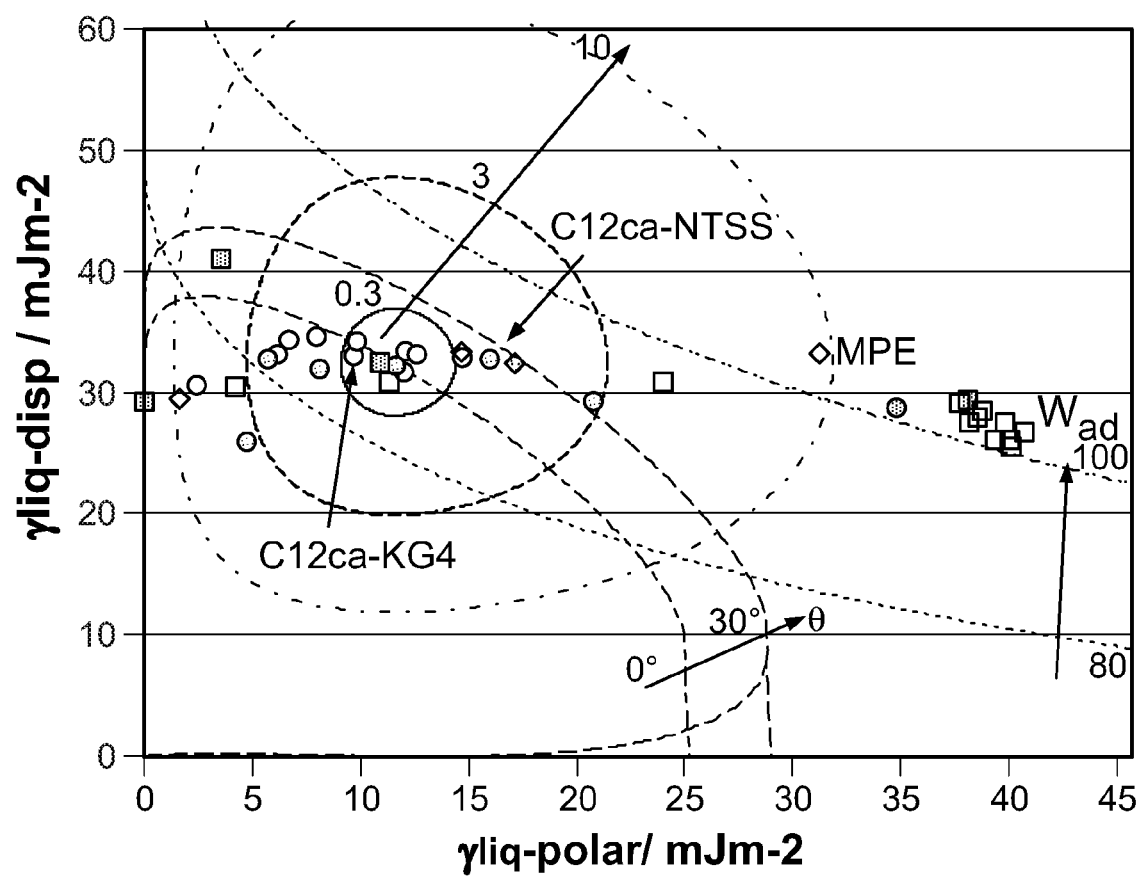
FIG. 5 is a diagram of polypropylene carbonate (QPAC-40) with several clays.
Figure 6:
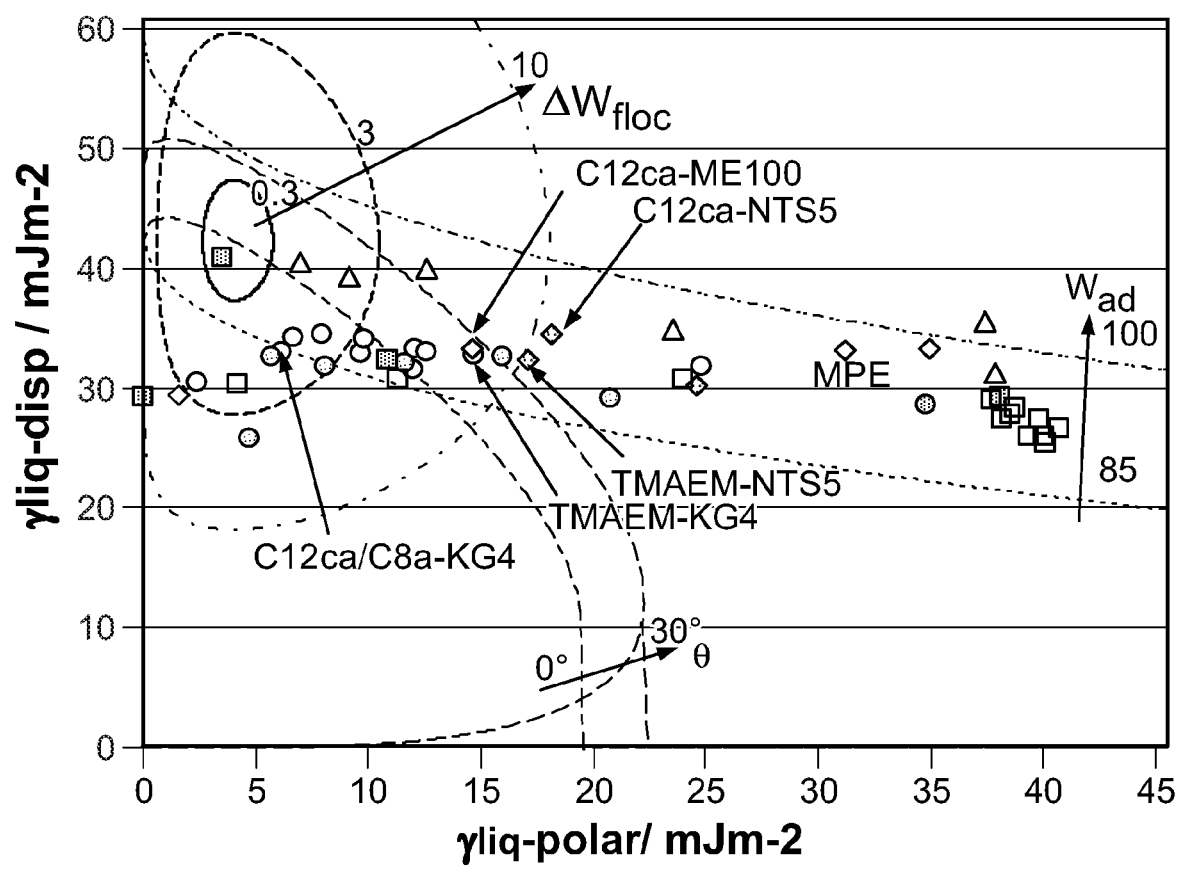
FIG. 6 is a diagram of polyethylene carbonate (PEC-QPAC-25) with several clays.
Figure 7:
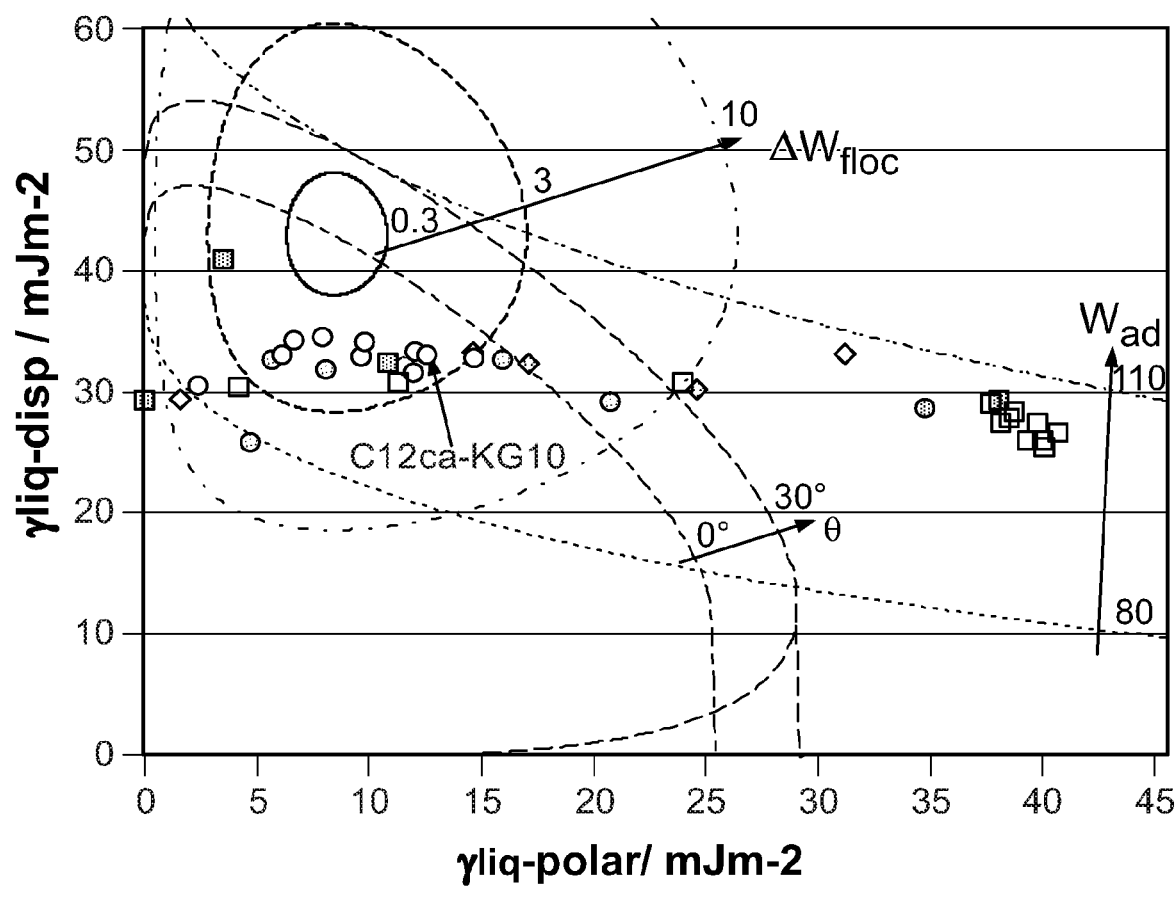
FIG. 7 is a diagram of ketone resin (Bremar-7080) with several clays.
Figure 8:
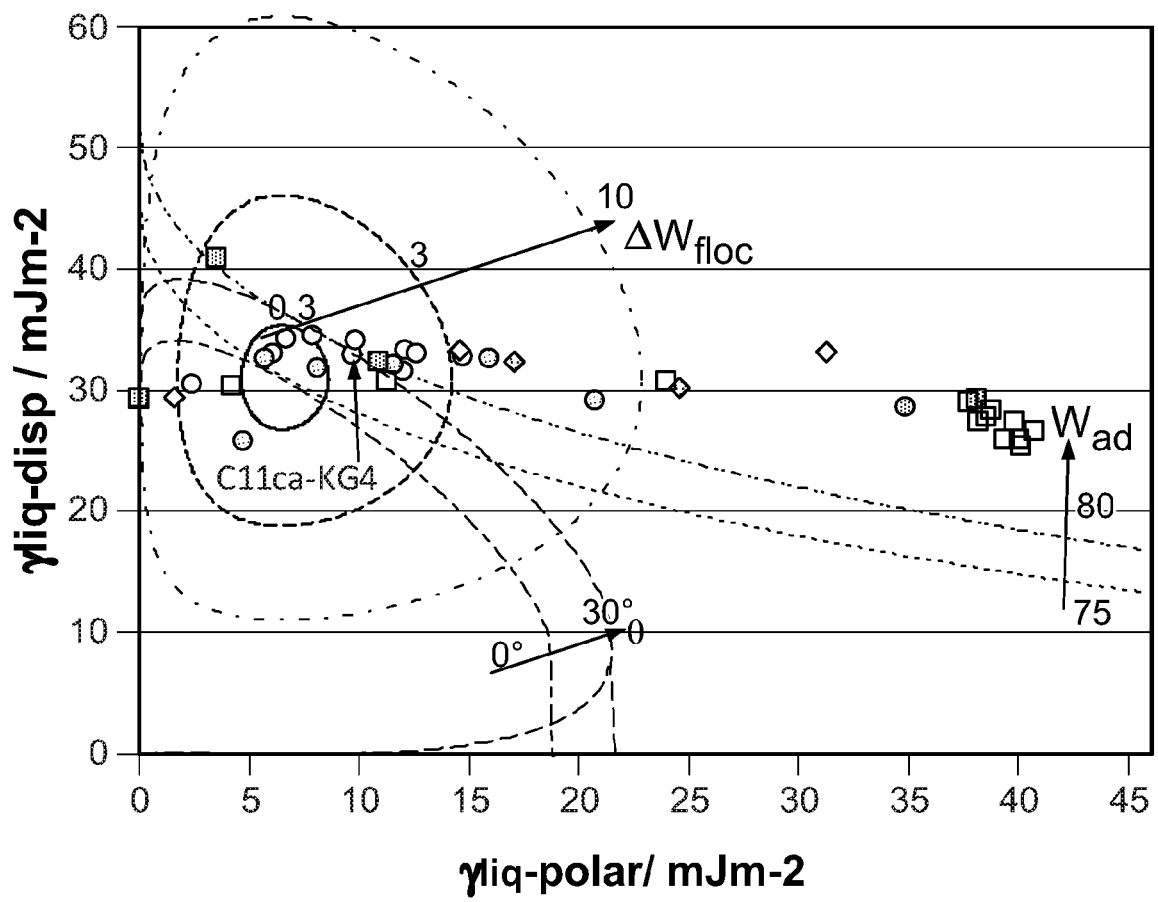
FIG. 8 is a diagram of polyurethane (sk-611-177) with several clays.
Figure 9:
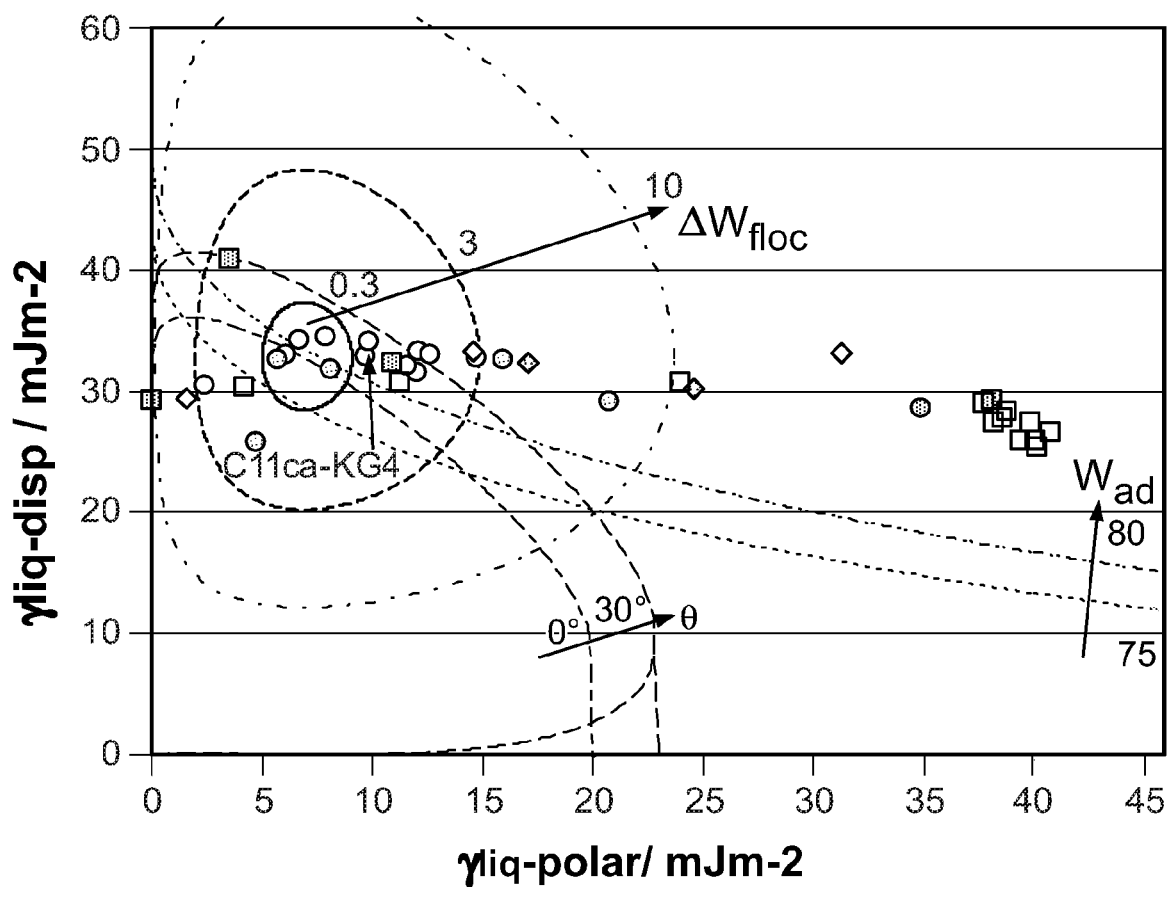
FIG. 9 is a diagram of polyurethane (sk-611-176) with several clays.

Polypropylene carbonate resin QPAC-40 demonstrates OTR (50%/50% relative humidity at 23° C.) of around 90 (cc/m²-d) and MVTR (90%/90% relative humidity at 38° C.) of 27 (g/m²-d) when it is evaluated at 2.8 gsm (gram square meter) on 12 micro meter PET. The significant improvements in OTR and MVTR are demonstrated when this resin is formulated with the clays located on the inner zone of the map where contact angle approaches zero, $W_{ad}$ is approximately 90, preferably no less than 60; and $W_{floc}$ is low, preferably <5, more preferably <3. Referring to FIG. 5 and table 2, the two clays, C12ca-KG4 and C12ca-NTS5 located in the preferred zone improve barrier whereas MPE located out of the zone does not.

TABLE 2

Gas barrier properties of polypropylene carbonate resin QPAC-40 with various clays.

| Resins | | | Clay | | Binder/ Clay | GSM dry | Conditions and Results | | Tape test |
|---|---|---|---|---|---|---|---|---|---|
| name | dispersive factor (mJ/m²) | polar factor (mJ/m²) | name | Zone | | | OTR cc/m²-d (23° C., 50%/50% RH) | MVTR cc/m²-d (38o C., 90%/90% RH) | |
| QPAC-40 | 32 | 12 | non | — | 1.0/1.0 | 2.8 | 90.1 | 39.1 | 0 |
| | | | C12ca-KG4 | 1st criteria | 1.0/1.0 | 2.8 | 41.9 | 26.5 | 6 |
| | | | C12ca-NTS5 | 2nd criteria | 1.0/1.0 | 2.8 | 65.7 | 36.0 | 8 |
| | | | MPE | out of the one | 1.0/1.0 | 2.8 | 93.6 | 34.7 | 1 |

Additional combinations to improve the gas barrier using the wetting envelop technique are demonstrated below in examples 3 to 6.

Example 3

TABLE 3

Gas barrier properties of polypropylene carbonate resin QPAC-25 with various clays.

| Resins | | | Clay | | Binder/ Clay | GSM dry | Conditions and Results | | Tape test |
|---|---|---|---|---|---|---|---|---|---|
| name | dispersive factor (mJ/m²) | polar factor (mJ/m²) | name | Zone | | | OTR cc/m²-d (23° C., 50%/50% RH) | MVTR cc/m²-d (38° C., 90%/90% RH) | |
| QPAC-25 | 42 | 4 | non | — | — | 2.0 | 102.2 | 32.8 | 9 |
| | | | C12ca/C8a-KG4 | 2nd criteria | 1.0/1.0 | 2.0 | 9.9 | 18 | 10 |
| | | | C12ca-ME100 | 3rd criteria | 1.0/1.0 | 2.0 | 16.3 | 26 | 10 |
| | | | C12ca-NTS5 | 3rd criteria | 1.0/1.0 | 2.0 | 57.5 | 312 | 10 |
| | | | TMAM-KG4 | 3rd criteria | 1.0/1.0 | 2.0 | 44.7 | 31.2 | 8 |
| | | | TMAM-NTS5 | 3rd criteria | 1.0/1.0 | 2.0 | 34.3 | 36 | 10 |
| | | | MPE | out of the zone | 1.0/1.0 | 2.0 | 100.1 | 29.7 | 4 |

Example 4

TABLE 4

Gas barrier properties of Bremar 7080 resin QPAC-25 with various clays.

| Resins | | | Clay | | Binder/ Clay | GSM dry | Conditions and Results | | Tape test |
|---|---|---|---|---|---|---|---|---|---|
| name | dispersive factor (mJ/m²) | polar factor (mJ/m²) | name | Zone | | | OTR cc/m²-d (23° C., 50%/50% RH) | MVTR cc/m²-d (38° C., 90%/90% RH) | |
| Bremar7080 | 43 | 8 | non | — | 1.0/1.0 | 0.8 | 86.7 | N/A | 9 |
| | | | C12ca-KG10 | 2nd criteria | 1.0/1.0 | 0.8 | 34.9 | N/A | 9 |

Example 5

TABLE 5

Gas barrier properties of SK-611-177 resin QPAC-25 with various clays.

| Resins | | | | | | | Conditions and Results | | |
| --- | --- | --- | --- | --- | --- | --- | --- | --- | --- |
| | dispersive factor | polar factor | Clay | | Binder/ Clay | GSM dry | OTR cc/m²-d (23° C., 50%/50% RH) | MVTR cc/m²-d (38° C., 90%/90% RH) | Tape test |
| name | (mJ/m²) | (mJ/m²) | name | Zone | | | | | |
| sk-611-177 | 31 | 6 | non C11ca-KG4 | — 2nd criteria | — 1.0/1.0 | 1.2 0.4 | 86.8 43 | N/A N/A | 9 9 |

Example 6

TABLE 6

Gas barrier properties of SK-611-176 resin QPAC-25 with various clays.

| Resins | | | | | | | Conditions and Results | | |
| --- | --- | --- | --- | --- | --- | --- | --- | --- | --- |
| | dispersive factor | polar factor | Clay | | Binder/ Clay | GSM dry | OTR cc/m²-d (23° C., 50%/50% RH) | MVTR cc/m²-d (38° C., 90%/90% RH) | Tape test |
| name | (mJ/m²) | (mJ/m²) | name | Zone | | | | | |
| sk-611-176 | 33 | 7 | non C11ca-KG4 | — 2nd criteria | — 1.0/1.0 | 1.2 0.4 | 83.1 50.8 | N/A N/A | 9 9 |

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. A barrier coating composition comprising a nanocomposite, wherein the nanocomposite comprises:
    a) a polymer having a surface tension of between 20 to 60 mJ/m², having a dispersive component of between 10 to 50 mJ/m², and a polar component of between 2 to 40 mJ/m²; and
    b) a nanoparticulate clay modified with a surface active agent having an aspect ratio of between 20 to 30,000, and a surface tension of between 20 to 60 mJ/m², having a dispersive component of between 10 to 50 mJ/m², and a polar component of between 2 to 40 mJ/m²; and
    wherein the adhesion ($W_{ad}$) between the polymer and the clay is greater than 60 mJ/m², the flocculation ($W_{floc}$) representing the dispersion of the clay in the polymer is not greater than 10 mJ/m², and the contact angle ($\theta$) between polymer and the clay is less than 30;
    wherein the polymer is selected from the group consisting of polyurethanes, polyester-urethanes, polyesters, cellulose derivatives, rosin esters, polypropylene carbonate resins, ketone resins, phenolic modified rosin esters, maleinised rosin esters, shellac, poly lactic acid, acrylics, styrenated acrylics, vinyl esters and/or vinyl alcohol co-polymers; and
    wherein the surface active agent is an anionic, amphoteric, non-ionic, or organic cationic, surfactant.

2. The barrier coating composition of claim 1, wherein the polymer has a surface tension of between 30 to 55 mJ/m², having a dispersive component of between 25 to 45 mJ/m², and a polar component of between 3 to 20 mJ/m²; and/or wherein the modified clay has a surface tension of between 30 to 55mJ/m², having a dispersive component of between 25 to 45 and a polar component of between 3 to 20 mJ/m²; and/or wherein the clay has an aspect ratio of between 100 to 30,000; and/or wherein the adhesion ($W_{ad}$) between the polymer and the clay is greater than 90 mJ/m², and/or wherein the flocculation ($W_{floc}$) is not greater than 5 mJ/m²; and/or wherein the contact angle ($\theta$) between polymer and the clay is less than 20.

3. The barrier coating composition of claim 1, wherein the flocculation ($W_{floc}$) is not greater than 3 mJ/m²; and/or wherein the contact angle ($\theta$) between the polymer and the clay is less than 10.

4. The barrier coating composition of claim 1, wherein the polymer is soluble in organic solvent.

5. The barrier coating composition according to of claim 1, wherein the polymer is a polypropylene carbonate resin; or wherein the polymer is a ketone resin; or wherein the polymer is a polyurethane.

6. The barrier coating composition of claim 1, Wherein the nanoparticulate clay is selected from kaolinite, hectorite, montmorillonite, vermiculite, atapulgite, illite, bentonite, halloysite, kaolin, mica, diatomaceous earth and fuller's earth, calcined aluminum silicate, hydrated aluminum silicate, magnesium aluminum silicate, sodium silicate and/or magnesium silicate.

7. The barrier coating composition of claim 1, wherein the organic cationic surfactant is an alkylammonium cationic surfactant.

8. The barrier coating composition of claim 1, wherein the surface active agent is selected from an organo, organo titanate organo zirconate intermediates, phosphonates and inorganic acids.

9. The barrier coating composition of claim 8, wherein the surface active agent is phosphoric acid; or wherein the surface active agent is a substituted phosphonate.

10. The barrier coating composition of claim 1, wherein the composition is a non-aqueous composition.

11. A coated substrate comprising the barrier coating composition of claim 1 on the surface of the substrate.

12. The coated substrate of claim 11, wherein the substrate is a packaging material.

13. The coated substrate of claim 12, wherein the packaging material is in the form of a film.

14. A coated article comprising the coated substrate of claim 11.

15. A coated article comprising the barrier coating composition of claim 1 on the surface of the article.

16. The coated article of claim 14, wherein the article is a packaging article.

17. The coated article of claim 16, wherein the packaging article is a food package; or wherein the packaging article is a pharmaceutical package.

18. A process for preparing a coated article or coated substrate comprising:
 a) applying the barrier coating composition of claim 1 to the surface of the article or substrate; and
 b) drying the harrier coating composition.

19. The coated article of claim 15, wherein the article is a packaging article.

20. The coated article of claim 19, wherein the article is a food package; or wherein the article is a pharmaceutical package.

* * * * *